(12) United States Patent
Cowley et al.

(10) Patent No.: US 11,595,607 B2
(45) Date of Patent: Feb. 28, 2023

(54) IMAGE SENSORS WITH VARIABLE READ OUT CIRCUITRY

(71) Applicant: SEMICONDUCTOR COMPONENTS INDUSTRIES, LLC, Phoenix, AZ (US)

(72) Inventors: Nicholas Paul Cowley, Wroughton (GB); Andrew David Talbot, Chieveley (GB); Mukesh Rao Engla Syam, Bangalore (IN)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 227 days.

(21) Appl. No.: 16/949,540

(22) Filed: Nov. 3, 2020

(65) Prior Publication Data

US 2021/0243397 A1  Aug. 5, 2021

(30) Foreign Application Priority Data

Jan. 31, 2020  (IN) .............................. 202011004380

(51) Int. Cl.
*H04N 5/378* (2011.01)
*H04N 5/3745* (2011.01)
*H04N 5/376* (2011.01)

(52) U.S. Cl.
CPC .......... *H04N 5/378* (2013.01); *H04N 5/3765* (2013.01); *H04N 5/37452* (2013.01)

(58) Field of Classification Search
CPC ... H04N 5/378; H04N 5/37452; H04N 5/3765
See application file for complete search history.

(56) References Cited

U.S. PATENT DOCUMENTS

| 7,148,927 | B2* | 12/2006 | Ogura | .................. | H04N 5/3742 |
| | | | | | 348/E9.01 |
| 8,368,785 | B2* | 2/2013 | Ryoki | .................. | H04N 5/3698 |
| | | | | | 257/292 |
| 9,191,582 | B1* | 11/2015 | Wright | ..................... | H04K 3/45 |
| 2006/0056513 | A1* | 3/2006 | Shen | ...................... | H04N 19/56 |
| | | | | | 375/E7.1 |
| 2010/0073535 | A1* | 3/2010 | Huggett | ................. | H04N 5/335 |
| | | | | | 348/297 |
| 2014/0183333 | A1 | 7/2014 | Johansson | | |
| 2017/0289475 | A1 | 10/2017 | Ha et al. | | |
| 2020/0029040 | A1 | 1/2020 | Johnson et al. | | |

* cited by examiner

*Primary Examiner* — Nhan T Tran
(74) *Attorney, Agent, or Firm* — Treyz Law Group, P.C.; David K. Cole

(57) ABSTRACT

An imaging device may have an array of image sensor pixels arranged in rows and columns and column readout circuitry coupled to the array. The rows of pixels may receive drive signals from row driver circuitry, and the drive signals may be sent from timing circuitry based on the locations of rows within the array. In particular, rows closer to the readout circuitry may require less settling time and therefore be driven faster than the rows further from the readout circuitry. All of the rows may be driven in a single direction, or the array of pixels may have a cut, in which case rows above the cut may be driven up and rows below the cut may be driven down. A frame buffer may be used to store the signals generated by the rows of pixels and may account for the asynchronous read out of image data.

18 Claims, 3 Drawing Sheets

IMAGE SENSORS WITH VARIABLE READ OUT CIRCUITRY

This application claims the benefit of and claims priority to Indian patent application No. 202011004380, filed Jan. 31, 2020, which is hereby incorporated by reference herein in its entirety.

BACKGROUND

This relates generally to imaging devices, and more particularly, to imaging sensors having circuitry that can read out image signals with variable timing.

Image sensors are commonly used in electronic devices such as cellular telephones, cameras, and computers to capture images. In a typical arrangement, an image sensor includes an array of image pixels arranged in pixel rows and pixel columns. Circuitry may be coupled to each pixel column for reading out image signals generated by the image pixels.

Typical image sensors include column readout circuitry that performs various read out operations that allow for the transfer of the image signals generated by the image pixels to an image processor. In conventional systems, column read out operations may take longer than desired, thereby resulting in a longer than desired frame rate of the image sensor.

It would therefore be desirable to be able to provide imaging devices with improved read out circuitry.

DETAILED DESCRIPTION

Embodiments of the present invention relate to imaging devices and, more particularly, to imaging devices having variable read out timing circuitry. It will be recognized by one skilled in the art, that the present exemplary embodiments may be practiced without some or all of these specific details. In other instances, well known operations have not been described in detail in order to not unnecessarily obscure the present embodiments.

Imaging systems having digital camera modules are widely used in electronic devices such as digital cameras, computers, cellular telephones, and other electronic devices. A digital camera module may include one or more image sensors that gather incoming light to capture an image. Image sensors may include arrays of image pixels. The pixels in the image sensors may include photosensitive elements such as photodiodes that convert the incoming light into electric charge. Image sensors may have any number of pixels (e.g., hundreds or thousands or more). A typical image sensor may, for example, have hundreds, thousands, or millions of pixels (e.g., megapixels). Image sensors may include control circuitry such as circuitry for operating the image pixels and read out circuitry for reading out image signals corresponding to the electric charge generated by the photosensitive elements. In some circumstances, the read out circuitry may read out image signals from the pixels on a row-by-row basis, and may read out each row at the same speed. However, in some cases, it may be desirable to increase the read out speed of the circuitry and thereby increase the frame rate of the camera. Therefore, image sensors may include variable timing read out circuitry to increase the read out speed for at least some rows in the array of pixels.

Figure 1:
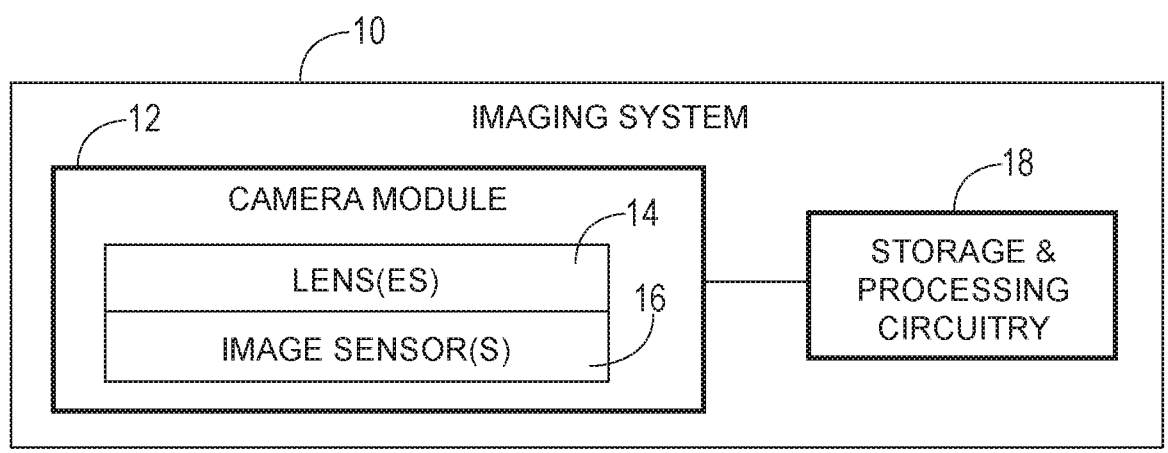
FIG. 1 is a diagram of an illustrative electronic device having an image sensor and processing circuitry for capturing images using an array of image pixels in accordance with an embodiment.

FIG. 1 is a diagram of an illustrative imaging system such as an electronic device that uses an image sensor to capture images. Electronic device 10 of FIG. 1 may be a portable electronic device such as a camera, a cellular telephone, a tablet computer, a webcam, a video camera, a video surveillance system, an automotive imaging system, a video gaming system with imaging capabilities, or any other desired imaging system or device that captures digital image data. Camera module 12 may be used to convert incoming light into digital image data. Camera module 12 may include one or more lenses 14 and one or more corresponding image sensors 16. Lenses 14 may include fixed and/or adjustable lenses and may include microlenses formed on an imaging surface of image sensor 16. During image capture operations, light from a scene may be focused onto image sensor 16 by lenses 14. Image sensor 16 may include circuitry for converting analog pixel data into corresponding digital image data to be provided to storage and processing circuitry 18. If desired, camera module 12 may be provided with an array of lenses 14 and an array of corresponding image sensors 16.

Storage and processing circuitry 18 may include one or more integrated circuits (e.g., image processing circuits, microprocessors, storage devices such as random-access memory and non-volatile memory, etc.) and may be implemented using components that are separate from camera module 12 and/or that form part of camera module 12 (e.g., circuits that form part of an integrated circuit that includes image sensors 16 or an integrated circuit within module 12 that is associated with image sensors 16). Image data that has been captured by camera module 12 may be processed and stored using processing circuitry 18 (e.g., using an image processing engine on processing circuitry 18, using an imaging mode selection engine on processing circuitry 18, etc.). Processed image data may, if desired, be provided to external equipment (e.g., a computer, external display, or other device) using wired and/or wireless communications paths coupled to processing circuitry 18.

Figure 2:
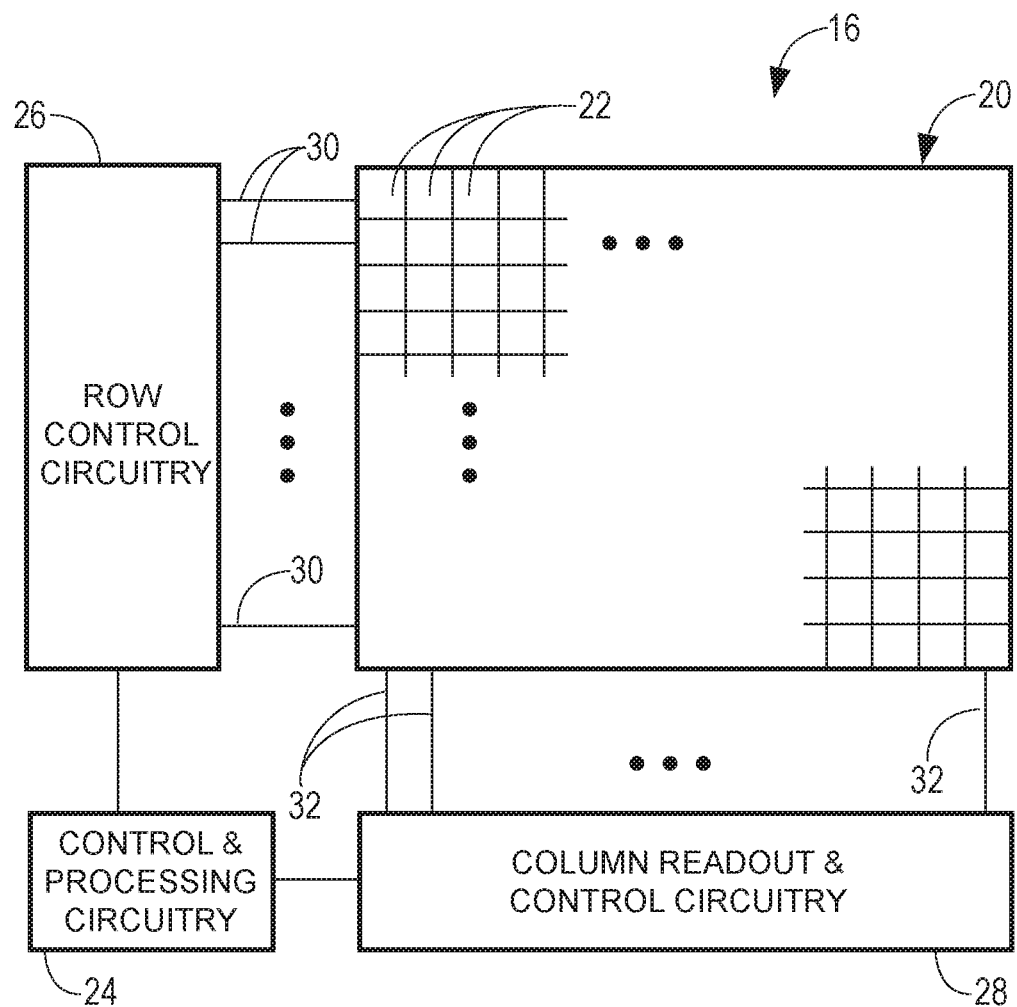
FIG. 2 is a diagram of an illustrative pixel array and associated readout circuitry for reading out image signals from the pixel array in accordance with an embodiment.

As shown in FIG. 2, image sensor 16 may include a pixel array 20 containing image sensor pixels 22 (sometimes referred to herein as image pixels or pixels) arranged in rows and columns and control and processing circuitry 24. Array 20 may contain, for example, hundreds or thousands of rows and columns of image sensor pixels 22. Control circuitry 24 may be coupled to row control circuitry 26 (sometimes referred to as a row decoder) and image readout circuitry 28 (sometimes referred to herein as column control circuitry, column control and readout circuitry, column read out circuitry, readout circuitry, processing circuitry, or column decoder circuitry). Row control circuitry 26 may receive row addresses from control circuitry 24 and supply corresponding row control signals such as reset, row-select, charge transfer, dual conversion gain, and readout control signals to pixels 22 over row control paths 30 to drive the read out of the pixels in the rows of pixels. One or more conductive lines such as column lines 32 may be coupled to each column of pixels 22 in array 20. Column lines 32 may be used for reading out image signals from pixels 22 and for supplying bias signals (e.g., bias currents or bias voltages) to pixels 22. If desired, during pixel readout operations, a pixel row in array 20 may be selected using row control circuitry 26 and image signals generated by image pixels 22 in that pixel row can be read out along column lines 32.

Image readout circuitry 28 (sometimes referred to as column readout and control circuitry 28) may receive image signals (e.g., analog pixel values generated by pixels 22) over column lines 32. Image readout circuitry 28 may include sample-and-hold circuitry for sampling and temporarily storing image signals read out from array 20, amplifier circuitry, analog-to-digital conversion (ADC) circuitry, bias circuitry, column memory, latch circuitry for selectively enabling or disabling the column circuitry, or other circuitry that is coupled to one or more columns of pixels in array 20 for operating pixels 22 and for reading out image signals from pixels 22. ADC circuitry in readout circuitry 28 may convert analog pixel values received from array 20 into corresponding digital pixel values (sometimes referred to as digital image data or digital pixel data). Image readout circuitry 28 may supply digital pixel data to control and processing circuitry 24 and/or processor 18 (FIG. 1) for pixels in one or more pixel columns.

If desired, image pixels 22 may include one or more photosensitive regions for generating charge in response to image light. Photosensitive regions within image pixels 22 may be arranged in rows and columns on array 20. Pixel array 20 may be provided with a color filter array having multiple color filter elements which allows a single image sensor to sample light of different colors. As an example, image sensor pixels such as the image pixels in array 20 may be provided with a color filter array which allows a single image sensor to sample red, green, and blue (RGB) light using corresponding red, green, and blue image sensor pixels arranged in a Bayer mosaic pattern. The Bayer mosaic pattern consists of a repeating unit cell of two-by-two image pixels, with two green image pixels diagonally opposite one another and adjacent to a red image pixel diagonally opposite to a blue image pixel. In another suitable example, the green pixels in a Bayer pattern are replaced by broadband image pixels having broadband color filter elements (e.g., clear color filter elements, yellow color filter elements, etc.). In another example, the image pixels may have filter elements that allow light outside of visible wavelengths (e.g., infrared or ultraviolet light) to pass through to the underlying pixel while blocking visible wavelengths. Alternatively, array 20 may be a monochrome array. The monochrome array may have broadband filters that are visibly transparent and transmit light across the visible light spectrum (e.g., the broadband filters may pass white light to the underlying pixels). In general, however, the monochrome array may have any desired color filters. The color filters may also include light redirecting structures, such as Fresnel lenses, to focus the light on the underlying pixel. These examples are merely illustrative and, in general, color filter elements of any desired color and in any desired pattern may be formed over any desired number of image pixels 22.

Image sensor 16 may be configured to support a global shutter operation (e.g., pixels 22 may be operated in a global shutter mode). For example, the image pixels 22 in array 20 may each include a photodiode, floating diffusion region, and local charge storage region. With a global shutter scheme, all of the pixels in the image sensor are reset simultaneously. A charge transfer operation is then used to simultaneously transfer the charge collected in the photodiode of each image pixel to the associated charge storage region. Data from each storage region may then be read out on a per-row basis, for example.

In general, image readout circuitry 28 may determine the charge generated by each pixel 22 using correlated double sampling. In particular, pixel values (e.g., values that correspond to charge generated by the pixels) for each location in array 20 may be calculated by comparing a known reset voltage to the voltage produced by the pixel. However, to perform this comparison, readout circuitry 28 must first be charged to a reset voltage and then to a pixel voltage when each row within array 20 is read out. Changing the charged value from the reset voltage to the pixel voltage requires a settling time. This settling time may be proportional to the difference between the reset voltage and the pixel voltage, for example. Generally, each row of pixels is read out at the same speed. However, rows closer to column read out points have lower RC time constants (the product of the circuit resistance and the circuit capacitance) than rows further from the column read out points due to the distance required for the charge to travel. Therefore, the rows closer to the column read out points need less settling time than the rows further from the column read out points. The image sensor may therefore include variable timing circuitry to variably decrease read out times for rows closer to the column read out points and thereby increase a frame rate of the image sensor.

Figure 3:
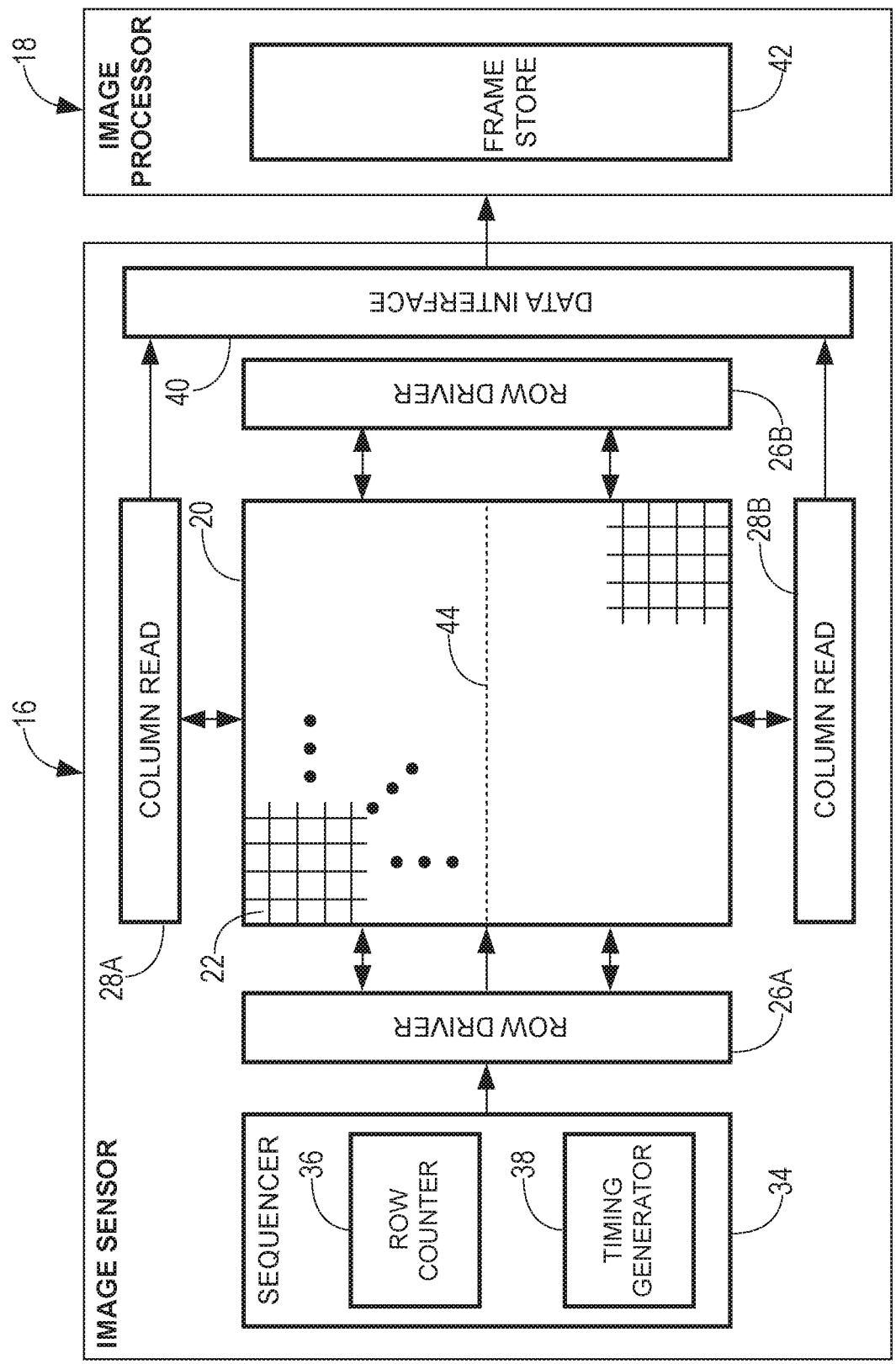
FIG. 3 is a diagram of an illustrative pixel array with variable timing read out circuitry in accordance with an embodiment.

An illustrative image sensor having variable timing circuitry is shown in FIG. 3. As shown in FIG. 3, pixel array 20 may be coupled to row driver circuitry 26A and 26B and to column read circuitry 28A and 28B. Row driver circuitry 26A and 26B may be a portion of row control circuitry 26 of FIG. 2, and column read circuitry 28A and 28B may be a portion of column readout and control circuitry 28 of FIG. 2, for example Pixels 22 of array 20 may generate charge in response to incident light. In a global shutter image sensor, all of pixels 22 may generate charge and transfer the charge to storage nodes simultaneously. Row drivers 26A and 26B may address a row of pixels to read out the charge associated with that row over column read circuitry 28A and 28B. Sequencer 34 may be coupled to row driver circuitry 26A and 26B, and may include row counter 36 and timing generator 38.

Row counter 36 may determine which row of array 20 should be addressed and read out over column read circuitry 28. Timing generator 38 may time the signals provided by sequencer 34 to row driver circuitry 26A and 26B. In particular, timing generator 38 may vary the length of time for which a row of pixels is read out based on the distance of the row from column read circuitry 28A. In particular, rows of pixels closer to column read circuitry 28 may have a lower RC time constant, and therefore require less settling time, than rows of pixels further from read circuitry 28. Therefore, the read out time for the rows closer to column read circuitry 28 may be reduced relative to the read out time for the rows further from column read circuitry 28 (e.g., the signals may be provided from timing generator 38 to row drivers 26 faster, thereby resulting in a faster read out). If desired, the read out times may be applied to groups of rows in array 20. For example, groups of two rows, three rows, five rows, ten rows, more than five rows, fewer than 10 rows, or any other desired number of rows of pixels may all have the same read out timing. When timing generator 38 receives a row from row counter 36 that corresponds to the next group of rows, the read out time may be adjusted based on a look up table that provides for read out times based on the given row, for example. In this way, the frame rate of image sensor 16 may be reduced relative to reading out all of the rows of array 20 using the same read out times (e.g., a length of time to accommodate the settling time of the rows furthest from the column readout circuitry).

After being addressed by row driver circuitry 26A and 26B, the signals of a given row of pixels may be read out through column read circuitry 28A and 28B and may then be fed through data interface 40. Data interface 40 may then pass the signals to frame store 42 in image processor 18. Frame store 42 may include a frame buffer that stores the signals produced by pixels 22 while other rows of pixels are being read out. The frame buffer in frame store 42 may be collocated, thereby accounting for timing differences in reading out the rows of pixels. Alternatively, if the frame buffer is not collocated, the signals from at least some of the rows of pixels may be passed through data interface 40 using the full bandwidth of the data interface, if desired. In this way, the signals that reach the frame buffer may all be normalized (e.g., may all be data packets of the same size) when they reach the frame buffer. In either case, the frame buffer in frame store 42 may account for the data from the rows of pixels arriving asynchronously. For example, the frame buffer may receive the data in packets and store blank data when not receiving any data. Processing circuitry in image processor 18 may then reconstruct the rows of data from the row data and blank data from the frame buffer.

The data produced by array 20 may be read out through column read circuitry 28A and/or 28B in a variety of ways. First, each row may be completely read up or down (e.g., completely toward column read circuitry 28A or toward column read circuitry 28B). In this case, only one of column read circuitry 28A or column read circuitry 28B may be required. If the signals are read up (e.g., toward column read circuitry 28A), the uppermost row of array 20 may have the shortest path to column read circuitry 28A, thereby having the lowest RC time constant and requiring the least settling time. The lowermost row of array 20 may have the longest path to column read circuitry 28A, thereby having the greatest RC time constant and requiring the most settling time. Therefore, timing generator 38 may drive row driver signals from row driver circuitry 26A and/or 26B at a faster rate for rows closer to the uppermost row than for rows closer to the lowermost row. For example, timing generator 38 may send the read row driver signals at a first rate for a first set of rows, a second rate that is slower than the first rate for a second of rows, etc. The sets of rows may be equal divisions of rows, such as each set including five rows, ten rows, more than ten rows, less than fifteen rows, or any other desired number of rows. Alternatively, the sets of rows may have different numbers of rows. If desired, the rate for each row of pixels may be stored in a look up table that is referenced by timing generator 38.

If the signals are read up toward column readout circuitry 28A, column readout circuitry 28B may be omitted. Additionally, although row driver circuitry 28A and 28B is shown on both sides of array 20, this is merely illustrative. Row driver circuitry may be included on only one side of array 20, if desired.

Moreover, although image sensor 16 has been described as reading the signals up toward column read circuitry 28A, the signals may instead be read down toward column read circuitry 28B. If desired, column read circuitry 28A may be omitted. If the signals are read down (e.g., toward column read circuitry 28B), the lowermost row of array 20 may have the shortest path to column read circuitry 28B, thereby having the lowest RC time constant and requiring the least settling time. The uppermost row of array 20 may have the longest path to column read circuitry 28B, thereby having the greatest RC time constant and requiring the most settling time. Therefore, timing generator 38 may drive row driver signals from row driver circuitry 26A and/or 26B at a faster rate for rows closer to the lowermost row than for rows closer to the uppermost row.

Array 20 may also include optional cut 44 at the center of the array. Optional cut 44 may allow for pixel rows above cut 44 to be read up toward column read circuitry 28A and for pixels below cut 44 to be read down toward column read circuitry 28B. If optional cut 44 is included, the furthest rows from both column read circuitry 28A and column read circuitry 28B will be at the center of array 20. Therefore, the central rows will have the highest RC time constant and require the longest settling time. Therefore, the uppermost and lowermost rows (e.g., the rows closes to column read circuitry 28A and column read circuitry 28B, respectively) of pixels may be driven at the fastest rate, while the rows at the center of the array may be driven at the slowest rate. As the rows are read out through column read circuitry 28A and 28B, the buffer in frame store 42 may receive signals from rows of pixels simultaneously. For example, the frame buffer may receive the signals from the uppermost and lowermost rows of pixels simultaneously, and the signals from the central rows simultaneously. In this way, the frame rate of image sensor 16 may be further reduced by reading out multiple rows simultaneously with variable timing.

Additionally, instead of reading the rows above cut 44 and below cut 44 in a mirrored fashion as previously described (i.e., reading the uppermost and lowermost rows of the array simultaneously first and reading the central rows simultaneously last), the closest row to one of column read circuitry 28A and 28B may be read at the same time as a row closest to cut 44. For example, if the uppermost row of the array is read out first, the row closest to cut 44 on the bottom half of array 20 may be read simultaneously (i.e., the row closest to cut 44 on the bottom half of array 20 may be driven to be read out at the same time as the uppermost row of the array). Each successive row below the uppermost row may be read out with each successive row below the row closest to cut 44 on the bottom half of the array, until the row closest to cut 44 on the top half of the array is read simultaneously with the lowermost row of the array (i.e., the lowermost row of the array may be driven to be read out while the row closest to cut 44 is being read out). However, the opposite arrangement may also be used, where if the lowermost row of the array is read out first, the row closest to cut 44 on the top half of array 20 may be read simultaneously. Each successive row above the lowermost row may be read out simultaneously with each successive row above the row closest to cut 44 on the top half of the array, until the row closest to cut 44 on the bottom half of the array is read simultaneously with the uppermost row of the array.

In this scheme, the rows closest to column read circuitry 28A and 28B will still be read faster than the rows closest to cut 44. Therefore, the timing will be asynchronous (e.g., a fast row will be read at the same time as a slow row). To account for this difference in timing, sequencer 34 may generate read row drive signals for multiple fast rows while the slow rows are being read out. For example, the first three fast rows may be read out at the same time as the first slow row. However, this is merely illustrative. In general, any number of rows may be read out concurrently with a slower row.

The bandwidth of data interface 40 may be distributed proportionally between the top and bottom portions of the array depending on the speed of the row being read out. For example, the rows read out at a faster speed may require higher bandwidth, and the rows read out a slower speed may require less bandwidth. To account for these differences, data interface 40 may divide the bandwidth using time domain multiplexing (TDM). In this way, data interface 40 may pass asynchronous signals from rows read out at different rates to frame store 42.

Frame store 42 may account for the asynchronous signals while storing the data generated by pixels 22. For example, the frame buffer in frame store 42 may receive the data in packets and store blank data when not receiving any data. Processing circuitry in image processor 18 may then reconstruct the rows of data from the row data and blank data from the frame buffer.

Figure 4:
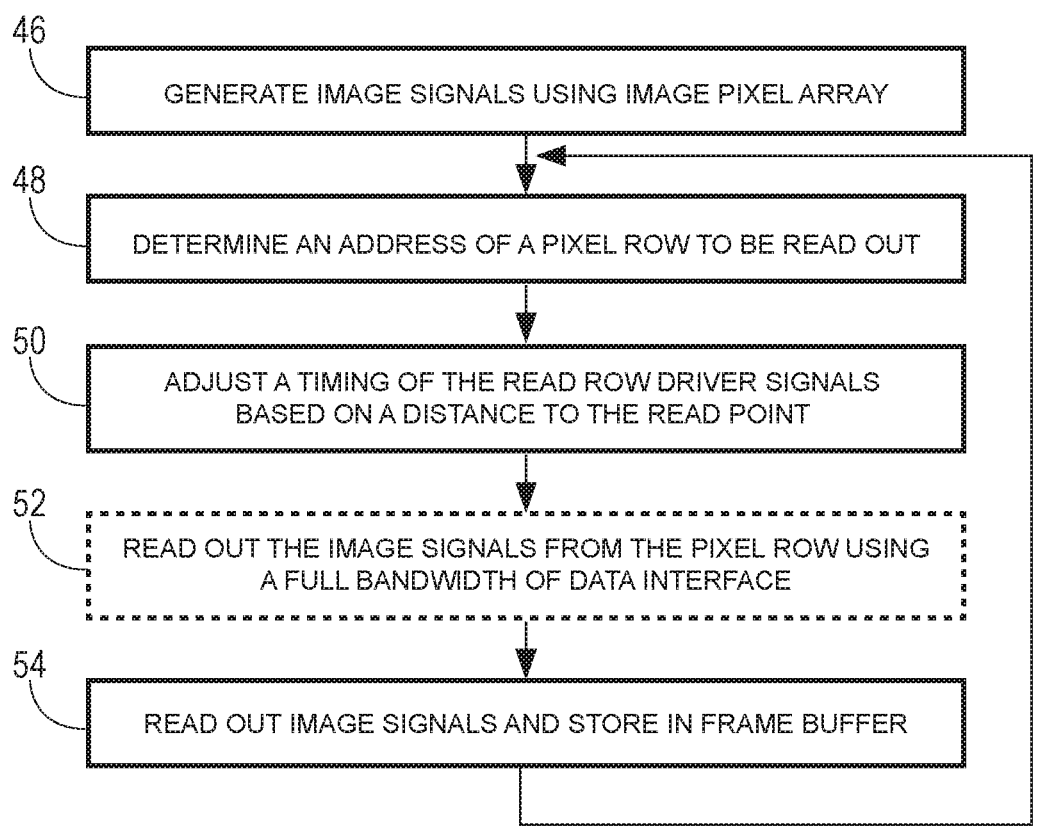
FIG. 4 is a flow chart of illustrative steps that may be performed by the variable pixel array and timing read out circuitry in accordance with an embodiment.

Although three ways of reading out the signals generated by array 20 have been described, any desired method may generally be used. When coupled with the variable row driver timing generated by timing generator 38, the frame rate of image sensor 16 may be increased. A flowchart of steps that may be used to read out image signals with variable timing is shown in FIG. 4. The steps are described in connection with the components shown in FIGS. 2 and 3.

As shown in FIG. 4, at step 46, image pixel array 20 may be used to generate image signals in response to incident light.

At step 48, row counter 36 may determine an address of a pixel row to be read out. The first row to be read out may be the uppermost pixel row of array 20 or may be the lowermost pixel row of array 20. If multiple rows are read simultaneously (e.g., if cut 44 is used), the uppermost and lowermost rows may be read simultaneously first, the central rows on either side of cut 44 may be read simultaneously, the uppermost or lowermost row and one of the central rows adjacent to cut 44 may be read first, or any other desired combination of rows may be read out first. After the first row(s) are read, row counter 36 may address the next row(s).

At step 50, timing generator 38 may adjust a timing of the read row driver signals based on a distance to the read point. The read point may be either column read circuitry 28A or column read circuitry 28B. Because pixel rows that are closer to the column read circuitry have lower RC time constants, the rows close to the read points require less settling time and therefore may be read out faster than rows farther from the read points. If desired, timing generator 38 may apply read out times to groups of rows in array 20. For example, groups of three rows, five rows, ten rows, more than five rows, fewer than 10 rows, or any other desired number of rows of pixels may all have the same read out timing. When timing generator 38 receives a row from row counter 36 that corresponds to the next group of rows, the read out time may be adjusted based on a look up table that provides for read out times based on the given row, for example.

At optional step 52, the image signals may be read out from the pixel rows through column read circuitry 28A and 28B and through data interface 40. If desired, the image signals may be read through data interface 40 using the entire bandwidth of data interface 40. This may be desirable, for example, if a non-collocated frame buffer is used to store the signals (e.g., the buffer is not able to process and store image signals with different timings on its own). By using the full bandwidth of data interface 40, the signals that reach the frame buffer may all be normalized (e.g., may all be data packets of the same size) when they reach the frame buffer, thereby allowing the frame buffer to store the signals. However, step 52 may be omitted if a collocated frame buffer is used or if other means are used to ensure that a non-collocated buffer receives compatible image signals.

At step 54, the image signals may be read out and stored in a frame buffer of image store 42. The image signals may be read out through column read circuitry 28A and 28B and through data interface 40.

The process may repeat along line 56 until all of the rows in array 20 have been read out and the associated signals stored in the frame buffer. Any desired read out method (e.g., reading all of the lines in one direction without a cut, using a cut and reading the rows in a mirrored fashion, or using a cut and reading the rows in an asynchronous manner) described in connection with FIG. 3 or other desired method may be used in combination with the steps described in FIG. 4. A graph showing the effect of variable timing on the frame rate of image sensor 16 is shown in FIG. 5.

Figure 5:
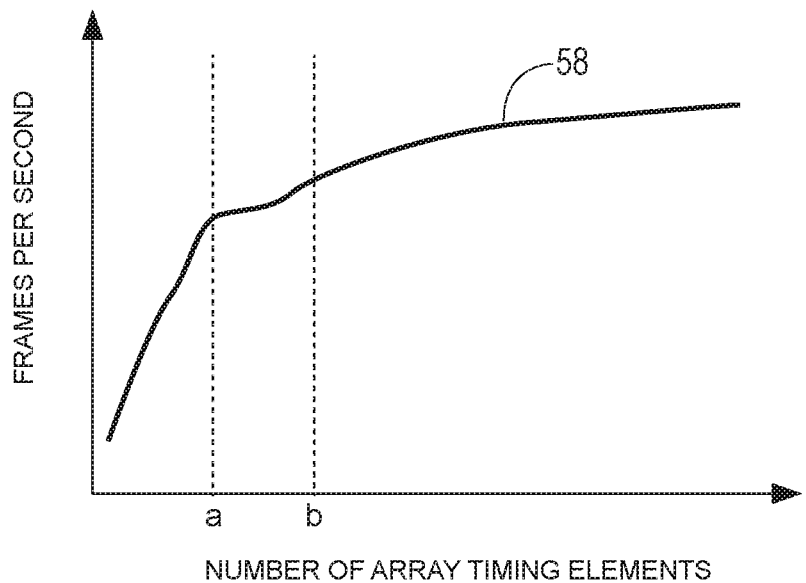
FIG. 5 is a graph of an illustrative relationship between a number of variable timing elements across a pixel array and an associated frame rate in accordance with an embodiment.

As shown in FIG. 5, an illustrative relationship between the number of array timing elements and the frame rate of image sensor 16 is given by curve 58. The array timing elements may be the groups of rows that receive different timing signals. For example, there may be three groups of rows that receive different timing signals, six groups of rows that receive different timing signals, ten or more groups of rows that receive different timing signals, or eight or fewer groups of rows that receive different timing signals. In general, array 20 may be divided into any number of elements that receive different timing signals.

As shown by curve 58, the more array timing elements that are used, the higher the frame rate (frames per second) of the image sensor. However, most of the increase in the frame rate of image sensor 16 may occur at points a and b. Points a and b may correspond to three elements, six elements, or any other desired number of elements. Therefore, it may be desirable to use a number of timing elements that correspond to point a or point b. However, this is merely illustrative. In general, any number of timing elements may be used in array 20. For example, every row in array 20 may have a unique timing, or there may be three groups or six groups of rows in array 20 with unique timings. In this way, the frame rate of image sensor 16 may be increased relative to fixed read out timing schemes.

Although variable time has been described in conjunction with a global shutter image sensor, this is merely illustrative. A rolling shutter image sensor may be used with the same variable timing circuitry, if desired.

Various embodiments have been described illustrating imaging systems having variable read out timing circuitry that may reduce the frame rate of an image sensor. Various methods of using the variable read out timing circuitry have also been described.

In accordance with an embodiment, an imaging system may include an array of pixels arranged in rows and columns and configured to generate image signals in response to incident light, variable timing circuitry that is configured to drive inputs to rows of pixels in the array of pixels at variable rates, and column output circuitry configured to output the image signals generated by the pixels in the rows of pixels in response to the inputs.

In accordance with some embodiments, the variable timing circuitry may be configured to select the variable rate for a given row based on the distance of the given row from the column output circuitry.

In accordance with some embodiments, the variable timing circuitry may be configured to output unique rates to at least two groups of rows of the array of pixels.

In accordance with some embodiments, a first group of rows of the at least two groups of rows may be a first distance from the column output circuitry, a second group of rows of the at least two groups of rows may be a second distance from the column output circuitry, the second distance may be greater than the first distance, and the first group of rows may be configured to be read out at a faster rate than the second group of rows.

In accordance with some embodiments, the column output circuitry may be located at an upper end of the array of pixels, the first group of rows may comprise an uppermost row of the array, and the second group of pixels may comprise a lowermost row of the array.

In accordance with some embodiments, the column output circuitry may be located at a lower end of the array of pixels, the first group of rows may comprise a lowermost row of the array, and the second group of pixels may comprise an uppermost row of the array.

In accordance with some embodiments, the column output circuitry may first column output circuitry located at an upper end of the array of pixels, and the image sensor may further include second column output circuitry located at a lower end of the array of pixels.

In accordance with some embodiments, the array of pixels may comprise a cut, image pixels above the cut may be configured to be read out through the first column output circuitry and image pixels below the cut may be configured to be read out through the second column output circuitry.

In accordance with some embodiments, an uppermost row of pixels of the array and a lowermost row of pixels of the array may be configured to be read out simultaneously, and rows adjacent to the cut on top and bottom halves of the array may be configured to be read out simultaneously.

In accordance with some embodiments, an uppermost row of pixels of the array and a row adjacent to the cut on a bottom half of the array may be configured to be driven to be read out at the same time, and a lowermost row of pixels of the array may be configured to be driven to be read out while a row adjacent to the cut on a top half of the array is being read out.

In accordance with some embodiments the imaging system may further include a frame buffer configured to store the outputs of the rows of pixels and a data interface interposed between the frame buffer and the column output circuitry.

In accordance with some embodiments, the frame buffer may be a collocated frame buffer.

In accordance with some embodiments, the frame buffer may be a non-collocated frame buffer and the outputs of the rows of pixels may be configured to be passed through the data interface using a full bandwidth of the data interface.

In accordance with an embodiment, a method may include generating image signals using an image pixel array comprising rows and columns of image pixels, with row driver circuitry, generating readout signals with variable timing based on positions of the rows in the array, reading out the image signals of the rows of pixels over column readout circuitry, and storing the image signals in a frame buffer.

In accordance with some embodiments, the method may further include after reading out the image signals of the rows of pixels over the column readout circuitry, reading out the image signals through a data interface.

In accordance with some embodiments, generating the readout signals with variable timing may include generating the readout signals with unique timings for at least two groups of rows in the array.

In accordance with some embodiments, reading out the image signals may include reading all of the rows in an upwards or downwards direction.

In accordance with some embodiments, reading out the image signals may include reading rows above a cut toward first column circuitry at an upper portion of the array and reading out rows below the cut toward second column circuitry at a lower portion of the array.

In accordance with an embodiment, an imaging system may include an image sensor and an image processor. The image sensor may include an image pixel array comprising rows and columns of image pixels that are configured to generate image signals, column output circuitry configured to output the image signals generated by the pixels in the rows of pixels, row driver circuitry that is configured to drive the image signals from the rows to the column output circuitry, variable timing circuitry configured to drive the row driver circuitry at a variable rate that is determined based on a location of a given row in the array, and a data interface that receives the image signals from the column readout circuitry. The image processor may include a frame buffer configured to store the image signals as they are read out.

In accordance with some embodiments, the variable timing circuitry may be configured to drive the row driver circuitry with unique rates for at least three different groups of rows in the array.

The foregoing is merely illustrative and various modifications can be made to the described embodiments. The foregoing embodiments may be implemented individually or in any combination.

What is claimed is:

1. An imaging system comprising:
   an array of pixels arranged in rows and columns on top and bottom halves separated by a cut, and configured to generate image signals in response to incident light;
   variable timing circuitry that is configured to drive inputs to the rows of pixels in the array of pixels at variable rates; and
   column output circuitry configured to output the image signals generated by the pixels in the rows of pixels in response to the inputs, wherein an uppermost row of pixels of the array is configured to be read out while a row adjacent to the cut on a bottom half of the array is read out, and wherein a lowermost row of pixels of the array is configured to be driven to be read out while a row adjacent to the cut on a top half of the array is being read out.

2. The imaging system defined in claim 1 wherein the variable timing circuitry is configured to select the variable rate for a given row based on the distance of the given row from the column output circuitry.

3. The imaging system defined in claim 2 wherein the variable timing circuitry is configured to output unique rates to at least two groups of rows of the array of pixels.

4. The imaging system defined in claim 3 wherein a first group of rows of the at least two groups of rows is a first distance from the column output circuitry, wherein a second group of rows of the at least two groups of rows is a second distance from the column output circuitry, wherein the second distance is greater than the first distance, and wherein the first group of rows is configured to be read out at a faster rate than the second group of rows.

5. The imaging system defined in claim 4 wherein the column output circuitry is located at an upper end of the array of pixels, wherein the first group of rows comprises an uppermost row of the array, and wherein the second group of pixels comprises a lowermost row of the array.

6. The imaging system defined in claim 4 wherein the column output circuitry is located at a lower end of the array of pixels, wherein the first group of rows comprises a lowermost row of the array, and wherein the second group of pixels comprises an uppermost row of the array.

7. The imaging system defined in claim 3 wherein the column output circuitry is first column output circuitry located at an upper end of the array of pixels, the image sensor further comprising:
    second column output circuitry located at a lower end of the array of pixels.

8. The imaging system defined in claim 7, wherein image pixels above the cut are configured to be read out through the first column output circuitry and wherein image pixels below the cut are configured to be read out through the second column output circuitry.

9. The imaging system defined in claim 1 further comprising:
    a frame buffer configured to store the outputs of the rows of pixels; and
    a data interface interposed between the frame buffer and the column output circuitry.

10. The imaging system defined in claim 9 wherein the frame buffer is a collocated frame buffer.

11. The imaging system defined in claim 9 wherein the frame buffer is a non-collocated frame buffer and wherein at least some of the outputs of the rows of pixels are configured to be passed through the data interface using a full bandwidth of the data interface.

12. A method comprising:
    generating image signals using an image pixel array comprising rows and columns of image pixels arranged on top and bottom halves of a cut;
    with row driver circuitry, generating readout signals with variable timing based on positions of the rows in the array;
    reading out the image signals of the rows of pixels over column readout circuitry, wherein reading out the image signals comprises reading out the image signals from an uppermost row of pixels of the array while reading out the image signals from a row adjacent to the cut on a bottom half of the array; and
    storing the image signals in a frame buffer.

13. The method defined in claim 12 further comprising:
    after reading out the image signals of the rows of pixels over the column readout circuitry, reading out the image signals through a data interface.

14. The method defined in claim 12 wherein generating the readout signals with variable timing comprises generating the readout signals with unique timings for at least two groups of rows in the array.

15. The method defined in claim 14 wherein reading out the image signals comprises reading all of the rows in an upwards or a downwards direction.

16. The method defined in claim 14 wherein reading out the image signals comprises reading rows above a cut toward first column circuitry at an upper portion of the array and reading out rows below the cut toward second column circuitry at a lower portion of the array.

17. An imaging system comprising:
    an image sensor comprising:
        an image pixel array comprising rows and columns of image pixels that are configured to generate image signals;
        column output circuitry configured to output the image signals generated by the pixels in the rows of pixels;
        row driver circuitry that is configured to drive the image signals from the rows to the column output circuitry;
        variable timing circuitry configured to drive the row driver circuitry at a variable rate that is determined based on a location of a given row in the array; and
        a data interface that receives the image signals from the column readout circuitry, wherein at least some of the image signals are configured to be passed through the data interface using a full bandwidth of the data interface; and
    an image processor comprising:
        a non-collocated frame buffer configured to store the image signals as they are read out.

18. The image sensor defined in claim 17 wherein the variable timing circuitry is configured to drive the row driver circuitry with unique rates for at least three different groups of rows in the array.

* * * * *